(12) United States Patent
Meillan

(10) Patent No.: US 11,174,914 B2
(45) Date of Patent: Nov. 16, 2021

(54) SUSPENSION DEVICE FOR HANGING CHAIRS AND/OR HAMMOCKS

(71) Applicant: LA SIESTA GMBH, Jugenheim (DE)

(72) Inventor: Jean-Christophe Meillan, Ingelheim (DE)

(73) Assignee: LA SIESTA GMBH, Jugenheim (DE)

( * ) Notice: Subject to any disclaimer, the term of this patent is extended or adjusted under 35 U.S.C. 154(b) by 318 days.

(21) Appl. No.: 16/355,255

(22) Filed: Mar. 15, 2019

(65) Prior Publication Data

US 2020/0093244 A1   Mar. 26, 2020

(30) Foreign Application Priority Data

Sep. 20, 2018 (DE) .................... 20 2018 105 413.9

(51) Int. Cl.
| A45F 3/26 | (2006.01) |
| A45F 3/24 | (2006.01) |
| A47C 17/84 | (2006.01) |
| F16G 11/04 | (2006.01) |

(52) U.S. Cl.
CPC .............. *F16G 11/046* (2013.01); *A45F 3/24* (2013.01); *A45F 3/26* (2013.01); *F16G 11/04* (2013.01); *Y10T 24/3969* (2015.01)

(58) Field of Classification Search
CPC . A45F 3/24; A45F 3/26; F16G 11/046; F16G 11/04; Y10T 24/3969
See application file for complete search history.

(56) References Cited

U.S. PATENT DOCUMENTS

| 4,222,157 | A | 9/1980 | Forman | |
|---|---|---|---|---|
| 5,950,556 | A | 9/1999 | Liebe | |
| 7,866,634 | B2* | 1/2011 | Lipke | F16G 11/046 |
| | | | | 254/389 |
| 8,132,299 | B2* | 3/2012 | Zhang | E06B 9/326 |
| | | | | 24/115 F |
| 8,495,800 | B2* | 7/2013 | Lipke | F16H 55/32 |
| | | | | 24/115 R |
| 9,157,505 | B2* | 10/2015 | Seader | A43C 1/06 |
| 9,277,802 | B2* | 3/2016 | Meillan | F16L 3/04 |
| 9,468,283 | B2* | 10/2016 | Meillan | F16G 11/103 |
| 10,495,181 | B2* | 12/2019 | Stephens | F16G 11/046 |
| 10,568,408 | B2* | 2/2020 | Meillan | A45F 3/24 |
| 10,648,537 | B2* | 5/2020 | Meillan | F16G 11/143 |

(Continued)

FOREIGN PATENT DOCUMENTS

| DE | 20 2011 105 048.8 | 1/2012 |
| DE | 20 2011 105 042.8 U1 | 7/2012 |
| DE | 20 2013 104 462 U1 | 12/2013 |

*Primary Examiner* — Robert Sandy
*Assistant Examiner* — Louis A Mercado
(74) *Attorney, Agent, or Firm* — Hauptman Ham, LLP

(57) ABSTRACT

A suspension device for hanging chairs and hammocks, the suspension device including a basic body and the basic body having defined therein apertures arranged for receiving and guiding a suspension rope. The basic body including at least two halves which are configured pivotably in respect of one another about a common connection axis, the connection axis forming a lower part of the suspension device and simultaneously a support for a holding loop of a hanging chair or a hammock, and the apertures for a length-adjustable arrangement of the suspension rope run in an upper part of the suspension device formed from both halves of the basic body.

13 Claims, 12 Drawing Sheets

(56) References Cited

U.S. PATENT DOCUMENTS

| | | | |
|---|---|---|---|
| 10,731,728 B2* | 8/2020 | Horgan | F16G 15/00 |
| 2011/0185541 A1* | 8/2011 | Guptill | F16G 11/04 |
| | | | 24/134 R |
| 2012/0159745 A1* | 6/2012 | Chan | F16G 11/046 |
| | | | 24/265 EC |
| 2020/0141472 A1* | 5/2020 | Chan | F16G 11/04 |

* cited by examiner

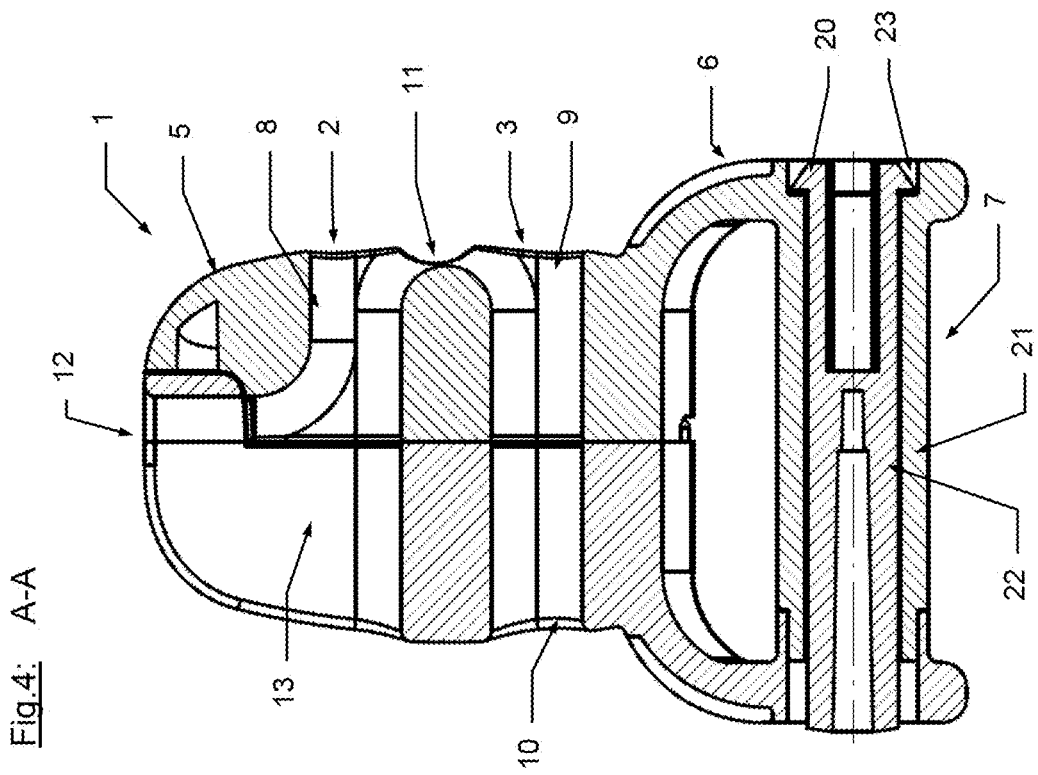
Fig. 4: A-A
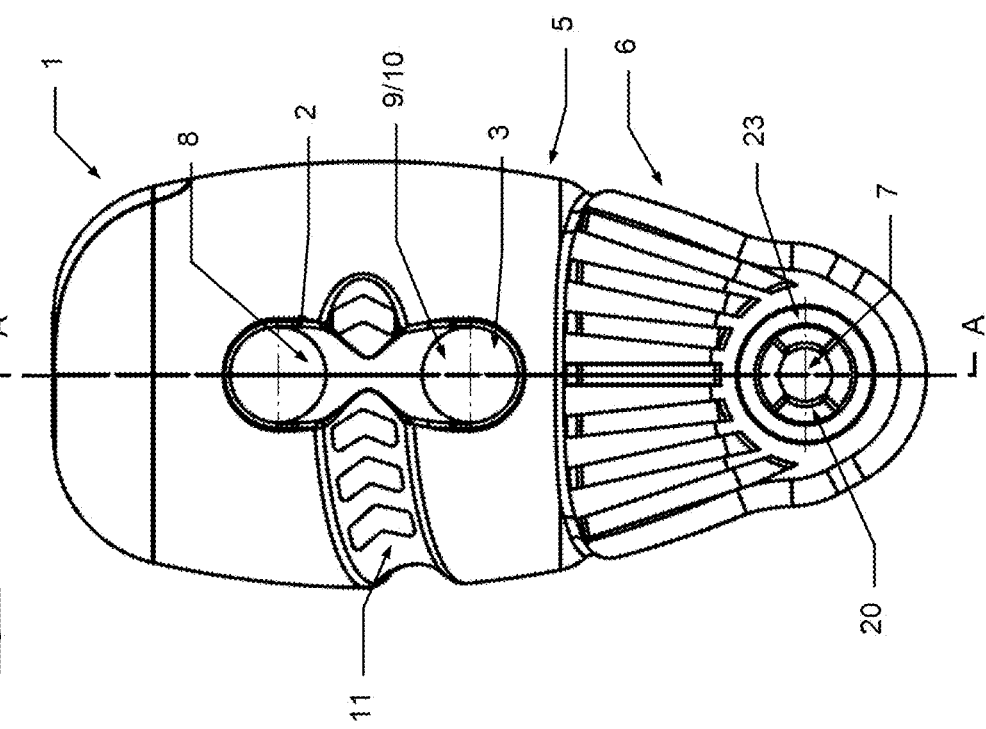
Fig. 3:

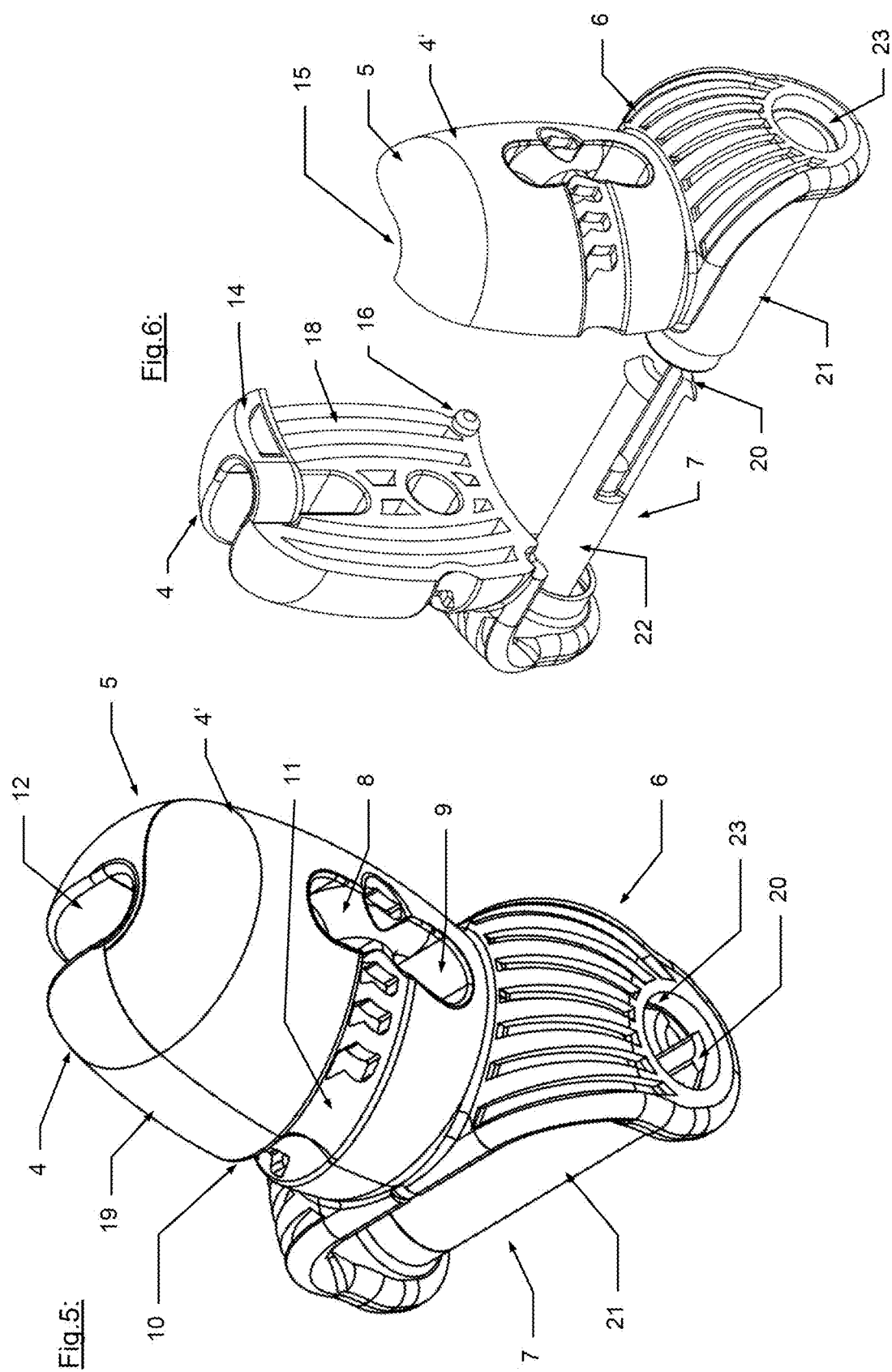

SUSPENSION DEVICE FOR HANGING CHAIRS AND/OR HAMMOCKS

BACKGROUND

One or more embodiments according to the present disclosure relate to a suspension device for hanging chairs and hammocks.

When suspending hanging chairs, and also hammocks, a height adjustment is routinely required in relation to the suspension ropes used, depending on the height and also the weight of the person using the hanging chair or hammock. In practice, this often simply involves shortening the suspension rope or a suspension chain accordingly in order to bring about a change in length, which is why multiple attempts are frequently needed or a corresponding adaptation is not even made on account of the awkwardness of the adjustment.

However, when hammocks or hanging chairs are used by different people or also in the case of hammocks or hanging chairs which are not permanently suspended at only one site, but are forever being used at different securing points, for example in the case of travelling hanging chairs or hammocks, this adjustment of the length of the suspension ropes is a routinely recurring action, as the securing points of the suspension ropes can also vary greatly, which is why technical solutions for easier length adjustment of the suspension ropes are also already known in the prior art.

Hence, for example, a prior-art hammock suspension device is disclosed in DE 20 2011 105 042.8 which comprises a body through which the holding rope is on the one hand guided through a plurality of apertures, wherein a holding loop is formed from the holding rope, which holding loop can in turn be suspended from a receiving means on the hammock device, once this loop has been guided through the securing loop on the hammock or hanging chair. To this extent, this body serves to facilitate a specific rope guide with a holding rope which allows a flexible length adjustment.

However, it has proved disadvantageous in this case for the special rope guide in this hammock suspension device to require a certain amount of practice, which means that it cannot always be satisfactorily operated by the user.

A further disadvantage is that the rope guide on this hammock suspension device has to be loosened at multiple points in order to alter the length of the suspension rope and the rope has to be guided through these apertures in order to achieve the desired adjustability.

The further publication DE 20 2013 104 462 U1 discloses a hammock suspension device for the guidance and length adjustment of a holding rope which is configured similarly to the previously described suspension and has a receiving means for the suspension of a holding loop, wherein a suspension loop is formed by this hammock suspension device and the holding rope guided therein, in which suspension loop the hammock loop on the end side is held. In other words, the free end of the holding rope is guided through the hammock loop and then once again suspended by a loop on the end side in the hammock suspension device.

So that the adjustability and detachable fixing of the hammock suspension device on the holding rope is achieved in this case, a special deflection of the holding rope in the guide in the hammock suspension device is disclosed wherein, in particular, a deflection of the holding rope in a guide channel running in the hammock suspension device means that during tensile loading caused by a person lying in the hammock, on account of the available rope guide the friction on the hammock suspension device prevents the holding rope from slipping and a displacement of the holding rope within the hammock suspension device therefore means that a different length of the holding rope can be achieved in relation to the suspended hammock.

The feature shared by the two entirely functional suspension devices described is that the suspension rope is guided with its end guided freely through the suspension device through the suspension loop on the hammock or the hanging chair and then in turn secured to the suspension device. In this case, a loop on the end side must be arranged on the suspension rope for both solutions shown, which loop is then hooked in a hook-like suspension region on the suspension device, as a result of which the securing of the hammock loop in this newly formed loop is guaranteed. These devices are also greatly displaced when the rope is shortened which means they can only be reached by the user with some difficulty, depending on the application.

However, it is desirable in principle, particularly when hammocks and hanging chairs are used by children, to minimize the number of potential hazards both on the hammocks and hanging chairs themselves and also the suspension device. In the case of the children's hanging chairs known in the art, potential hazards of this kind have already been eliminated for the most part. The formation of a loop in the region where the hammock is suspended through the suspension rope is therefore problematic and may potentially represent a possible hazard of this kind in this case, which is why it is also desirable for suspension loops of this kind to be avoided.

Furthermore, a plurality of technical devices is known in the art which are used to tension cables and ropes and also for the detachable connection thereof. Here, reliance is often placed on mechanical, for example spring-loaded, fixing elements, such as in publication U.S. Pat. No. 5,950,556, for example, in which a retaining pin has to be pressed in against a spring force in order to move a rope through this device. When this securing means is once again released, the rope becomes fixed in the device. Other frequently used devices are used for tightening a rope, as is the case, for example, when tensioning a tent. To this end, reference is made by way of example to publication U.S. Pat. No. 4,222,157, in which a device for tightening a rope is disclosed.

Applications of this kind are functional for the tensioning of ropes in the camping sector, insofar as they are not exposed to heavy loads. A weight loading of a hammock or a hanging chair designed for 150 kilograms or more cannot, however, be accommodated by a device of this kind. Although the shortening of the rope would be adjustable, there would be severe wear and tear on account of the tilting action on the rope. Here, too, the thing these solutions have in common is that the looping of the rope guide that is regarded as problematic continues to exist.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. One or more embodiments of the invention is explained in greater detail below with the help of drawings. In the drawings:

FIG. 3 shows a side view of the suspension device rotated through 180 degrees compared with FIG. 2;

FIG. 4 shows a section A-A through the suspension device according to FIG. 3;

FIG. 5 shows a perspective side view of the suspension device 1 in the closed state;

FIG. 6 shows a perspective side view of the suspension device 1 in a dismantled state in two halves 4 and 4';

DETAILED DESCRIPTION

Figure 2:
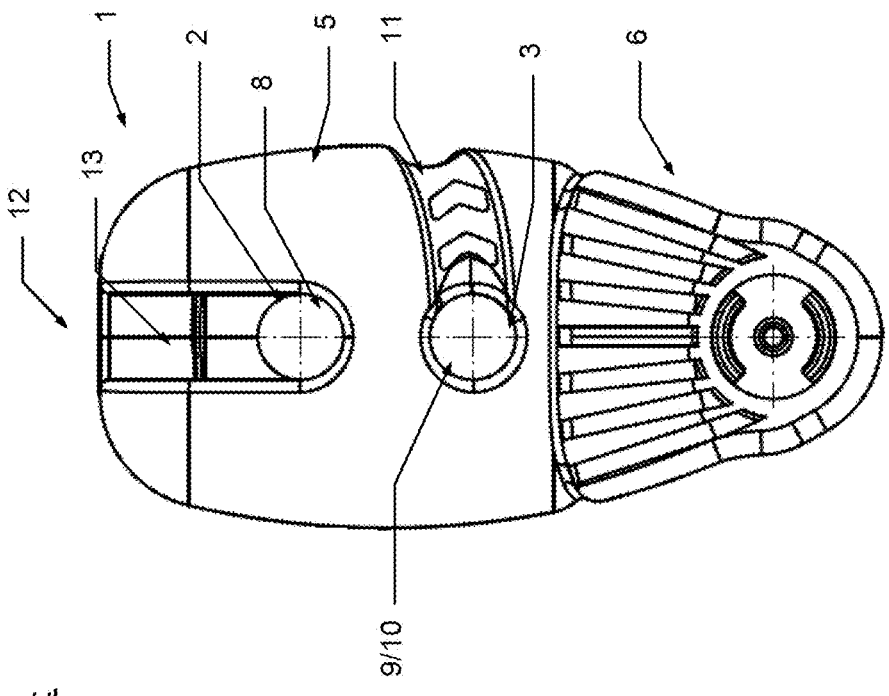
FIG. 2 shows a further side view rotated through 90 degrees.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

One of the problems addressed by one or more embodiments of the present invention is therefore that of creating a suspension device for hanging chairs and hammocks which, on the one hand, provides an easily length-adjustable connection between the free end of a suspension rope and the holding loop of a hanging chair or a hammock, wherein this is intended to avoid a looping of the suspension rope with this hammock suspension device and the device is intended to remain easily accessible. At the same time, the suspension device should be easy to secure to the holding loop of a hanging chair or a hammock.

This is achieved according to one or more embodiments of the invention by a suspension device for hanging chairs and hammocks as claimed in claim 1.

Advantageous embodiments of the invention are the subject matter of the other claims.

The basic idea for realization of the suspension device according to one or more embodiments of the invention is that the basic body of the suspension device is divided into two functional regions, namely an upper part which is used for receiving the suspension rope and by a special arrangement of apertures allows a length-adjustable arrangement of the suspension rope without looping being necessary in addition for this purpose.

A lower part is attached to this upper part which is used to receive the connection to the hammock or the hanging chair. In this case, the new and inventive formulation is that this combination of upper and lower part is realized in a basic body of the suspension device structurally made up of two parts, wherein these halves are configured to be pivotable relative to one another about a common axis which, as the axis-like holding body, simultaneously forms the support for the holding loop of a hanging chair or a hammock.

In an advantageous variant of an embodiment of the invention, the basic body made up of the lower and upper part is divided in the longitudinal axis roughly centrally into two halves which are pivotable away from one another about a common pivot axis. As a result, the receiver for a holding loop therefore remains in the lower part, even when the basic body is pivoted up and therefore opened; only the upper part in which the holding rope guide of the suspension device is arranged is separated when the basic body is pivoted open.

During use, it is possible for the opened basic body of the suspension device to be introduced into a holding loop, so that the holding loop rests against the axis-like holding body of the suspension device. It is then possible for the suspension device to be closed by further pivoting of the two halves of the basic body, following which the suspension device is brought into operation by introducing a holding rope into the upper part of the suspension device.

It results from this that there are no loose components on the suspension device which have to be opened to receive the holding loop, as the two halves of the basic body that can be pivoted in respect of one another are fixedly connected to one another via the pivot axis of the axis-like holding body. On the other hand, it is realized in such a manner that only this basic body has to be closed around the holding loop of a hanging chair, for example, in order for the advantages of the holding rope guide in the upper part of this suspension device to be capable of being utilized.

The fact that no closing bodies are required in order to keep the suspension device closed during use for the suspension of a hanging chair, for example, should be regarded as a further advantage. It is not necessary in principle, for example, for clamping connections or similar to be attached to the suspension device made up of two halves, since the rope guide in the upper part of the suspension device is chosen in such a manner that through the arrangement of the holding rope in the upper part of the suspension device, the suspension device itself is closed, as the two pivotable halves of the basic body are connected to one another by the holding rope guided in the upper part.

In other words, the holding rope is, on the one hand, advantageous as it can easily be guided in a length-adjustable manner in the upper part of the suspension and, at the same time, the holding rope guided in the upper part means that the two halves of the basic body of the suspension device are fixed in their position and, as it were, tied by the holding rope. The weight loading, in particular, during the use of a hanging chair suspended on this suspension device, for example, makes it impossible for the halves of the basic body to be pivoted in respect of one another.

An explanation is provided below of how the rope guide runs in the upper part of the suspension device in conjunction with FIGS. 9-12.

Figure 9:
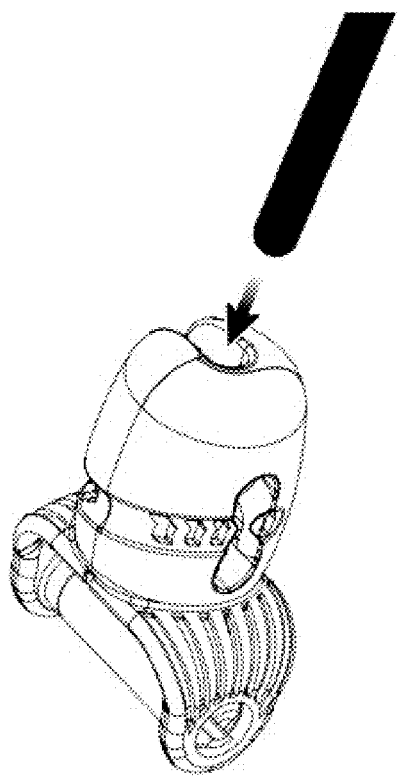
FIGS. 9-12 show perspective views of the suspension device during insertion of a rope according to an embodiment.

For suspension on a suspension rope, the upper part has two apertures in an advantageous variant, the first of which has an inlet opening which is introduced centrally into the upper side of the upper part, as the tensile direction of the hanging chairs which are suspended, for example, leads a guide on the top into the suspension device to protect the suspension rope as shown in FIG. 9. In order to achieve secure fastening of the suspension rope in the upper part, the suspension rope introduced into the first aperture on the top side is diverted and fed out of the upper part at the side as shown in FIG. 10.

Figure 10:
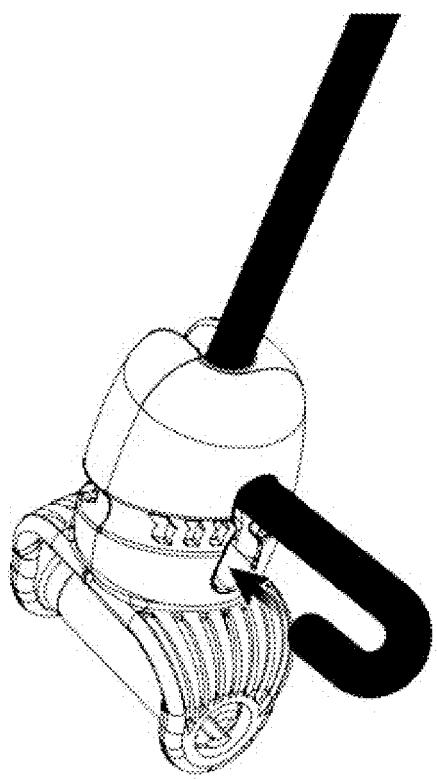
Figure 11:
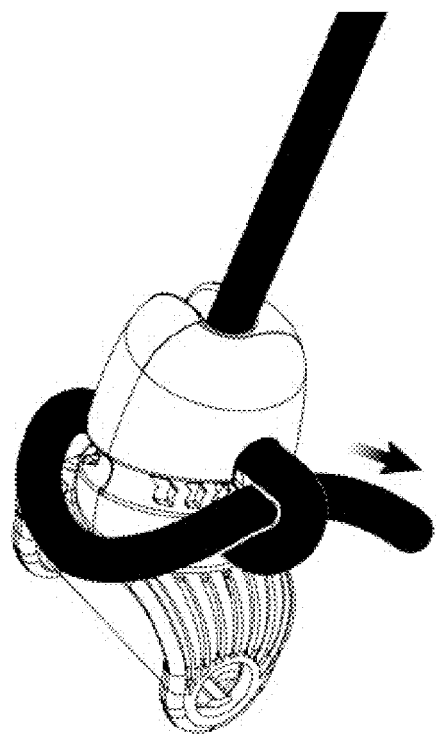

Below this outlet opening runs a second aperture transversely through the upper part, so that the suspension rope emerging from the outlet opening of the first aperture is introduced straight into the inlet opening of the second aperture lying directly below and can emerge from this on the opposite side of the upper part as shown in FIGS. 10 and 11. Consequently, this rope guide means that a certain degree of stability has already been achieved; however, this is not sufficient in all embodiments to guarantee safe suspension.

Figure 12:
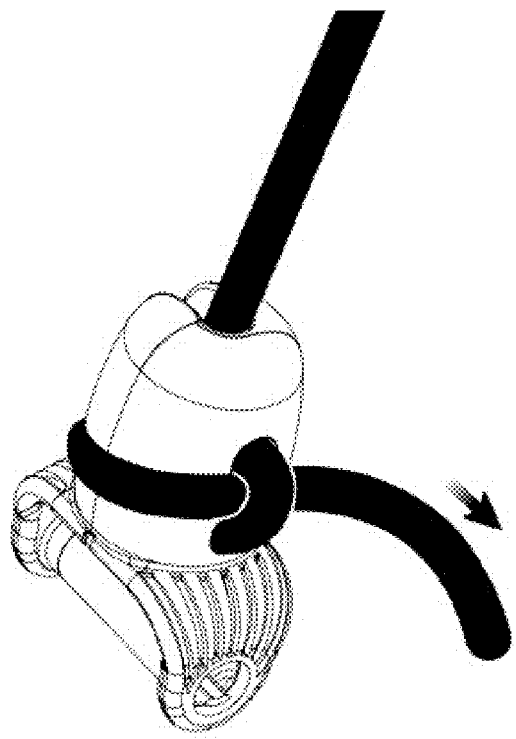
Figure 13:
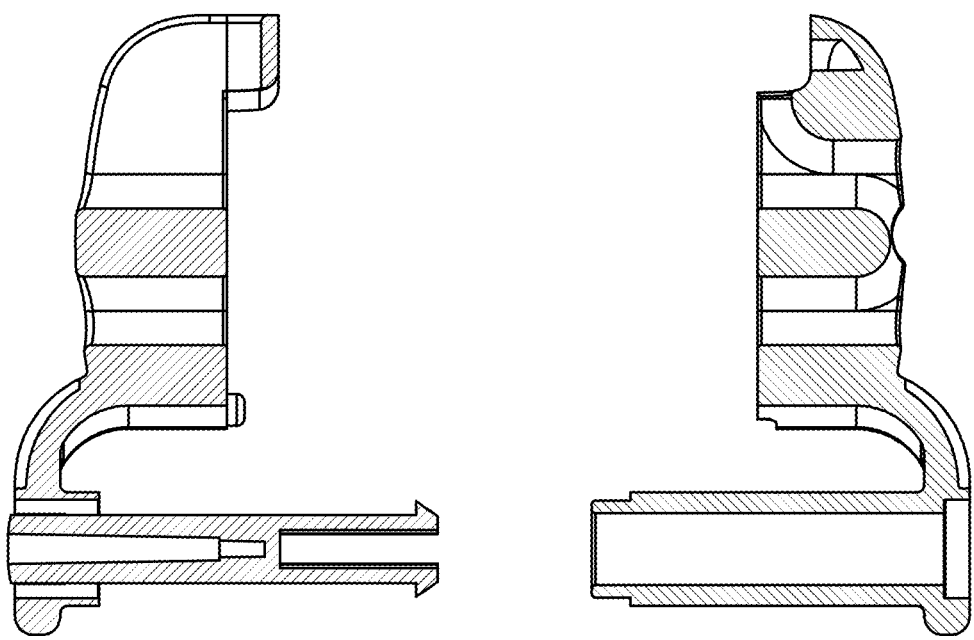
FIG. 13 shows the view of FIG. 4 in a dismantled state.

For this purpose, it is provided according to one or more embodiments of the invention that free ends have to be guided around from the outlet opening of the second aperture about the side of the upper part and fed into the intermediate region between the outlet opening of the first aperture and the inlet opening of the second aperture as shown in FIG. 11. In this case, through the rope guide there is a rope portion on the outside of the upper part, below which rope portion the free end of the suspension rope can be guided as shown in FIG. 12. When a weight load is applied to this suspension, this causes the suspension rope to be pulled taut in the suspension device, so that the free end of the rope guided through under the lateral portion of the rope is pressed onto the upper part of the suspension device and it is no longer possible for the suspension rope to slip out of the suspension.

At the same time, an easy length change can be achieved in that the suspension rope is conducted further through the first aperture, for example by shortening the distance from a suspension point, and is introduced into the second aperture. Only the free end must then be drawn through further below the outside rope portions, so that a taut rope suspension is once again achieved.

For the arrangement of the apertures in the upper part of the basic body, for the dual function thereof in relation to the connection of the two halves that are pivotable in respect of one another, it is important for the apertures to be selected in such a manner that they run transversely to the longitudinal axis of the suspension device and therefore also transversely to the dividing surface between the two halves of the basic body being connected. In this way, it is possible for the apertures running transversely to the longitudinal axis in the basic body in both halves to run flush with one another when the two halves are in a closed arrangement and thereby form a joint guide for the holding rope which is guided in the upper part of the basic body. It is thereby possible for the rope guide in the upper part to fix the two halves of the basic body which are pivotable in respect of one another in their closed position relative to one another and prevent these halves from being pivotable in respect of one another after the holding rope has been guided through the apertures.

The length adjustability property is further improved in an advantageous embodiment of the invention in that the inlet opening into the first aperture is not only configured as a bore guided into the basic body, but as slot-like recesses extending to lateral walls of the upper part. This leads to the suspension rope on the upper side being capable of being pressed laterally in this slot and thereby guided out of the right-angled deflection position into a straight guide position vertically in the upper part of the basic body. In this way, the rope can easily be pulled through the outlet opening of the first aperture, so that the suspension is either lengthened or shortened.

In order to guarantee the securing referred to of the free rope portion between the outlet opening of the first aperture and the inlet opening of the second aperture, the distance between these inlet and outlet openings is selected in such a manner that it at least corresponds to the diameter of the apertures themselves. The background is that the apertures are roughly configured to correspond to the diameter of the suspension rope used, so that a secure hold of the suspension device is produced. In order to guide through the suspension rope between the openings, the distance between these two openings should roughly at least correspond to the rope diameter and, to this extent, be similar to the diameter of the apertures.

In an advantageous embodiment, this distance roughly corresponds to the diameter of the apertures. However, there is also a degree of variability in this case.

In a further advantageous embodiment, this securing of the suspension rope is further improved in that a guide channel starting from the outlet opening of the second aperture runs in the region between the outlet opening of the first aperture and the inlet opening of the second aperture. In this way, the free end of the suspension rope which emerges from the outlet opening of the second aperture is laid in this guide channel running in a recessed manner in the basic body of the upper part, and is thereby safely guided in the intermediate region between the outlet opening and the inlet opening and also arranged there in the upper part in a recessed manner.

This also supports, on the one hand, the use of the suspension, as this channel makes it obvious to the user where the suspension rope has to be guided in order to secure it against slipping through the suspension. On the other hand, it also reinforces the effect of the mount, as the rope has an ideal course on the outer surface of the suspension device.

Also, in relation to the secure fixing of the two halves forming the basic body in their closed position, the guide channel according to one or more embodiments of the invention is an advantageous technical component, since this guide channel leads away from the outlet opening of the second aperture via both halves into a region between the outlet opening of the first aperture and the inlet opening of the second aperture on the second half of the basic body.

In other words, the free end of the holding rope is guided by the first half of the basic body in the guide channel on the casing of the basic body to the second half of the basic body, wherein the guide channel extends when the two halves are in the closed position in a line over this casing region of both halves. By clamping the free end of the holding rope below the loop of the holding rope formed between the outlet opening of the first aperture and the inlet opening of the second aperture, the basic body of the suspension device is thereby enclosed by the holding rope portion between the outlet opening of the second aperture and the inlet opening of the second aperture and consequently fixed in the closed position.

In this case, it is advantageously solved structurally in an embodiment in such a manner that the halves of the basic body are guided movably in respect of one another through interlocking steps on the contact surfaces thereof in only one direction. In other words, the two halves of the basic body can only be pivoted away from one another in a defined direction and when the two halves are closed and moved to one another, the steps formed in the contact surfaces mean that an interlocking of these surfaces of the two halves abutting one another is predefined in such a manner that the halves interlock in a form-fitting manner in the defined closing position of the basic body.

Apart from the formation of at least one step and a corresponding receiver for this step between the halves of the basic body being connected, recesses and projections can also be provided on the contact surfaces of the halves which are movable in respect of one another, which recesses and projections likewise perform the function of fixing the correct position of the two halves which are movable in respect of one another and therefore bringing about a stabilization of the halves closed into the basic body, as in this way only one pivoting movement direction of the halves in respect of one another remains, which is secured by the holding rope guided in the apertures when the suspension device is used.

Advantageously, it is therefore provided in an embodiment of the invention that the portion of the holding rope enclosing both halves on the casing of the basic body spans and connects the region of the basic body which can be pivoted open when opening the basic body. Consequently, the encompassing of the basic body in this region brings about a tensioning of the two halves of the basic body in addition to securing by guiding the holding rope in the apertures running flush in both halves.

An advantageous possible embodiment of this structure envisages that the connection axis is configured as an at least two-part axis body which is connected by means of a plug-in connection. An advantageous embodiment of the suspension device envisages a basic body which is made up of two halves on each of which a portion of the holding body that can be connected to the axis is arranged. In other words, the holding body connecting both halves and acting as a pivot axis is fixedly connected to a structural portion in each case on each half of the basic body, wherein these regions forming the axis-shaped holding body of the halves of the basic body are connected to one another to assemble the basic body.

In this case, there are fundamentally different structural possibilities for how the two portions connected into an axis can be formed. In an advantageous embodiment, a sleeve-like axial portion on the first half of the basic body is combined with a pin-like second portion on the second half of the basic body in such a manner that the pin-like portion is inserted into the sleeve-like portion and is locked there by a clamping connection. In this way, a pin-like rotational axis arranged on the second half runs in the guide sleeve on the first half of the basic body, as a result of which a stable, secured rotational movement of the second half of the basic body is safeguarded via this rotational axis. The rotational axis formed in this manner is very stable and the holding body can thereby reliably fulfill the actual basic function, namely receiving the load of a person sitting in a hanging chair, for example.

It is also contemplated in principle that the holding body is arranged as a rotational axis only on one half of the basic body and engages with a receiver on the second half of the basic body and is rotatably connected there by a fastening element, for example. In other words, it is also possible to use a separate connecting body to connect these elements or to arrange fasteners at one end on the rotational which only engage rotatably with a receiver on the first or second half of the basic body. A connection body penetrating the entire axis may also be advantageous in this case.

Finally, it is also possible for a completely separate rotational axis-like holding body to be arranged between the two halves of the basic body and either inserted through a corresponding form connection in corresponding receiver on the halves or secured through additional connecting elements in or on the halves of the basic body in such a manner that they can be guided pivotably about this separate axis-like holding body. A connecting body penetrating the entire axis may also be advantageous with this embodiment.

Figure 1:
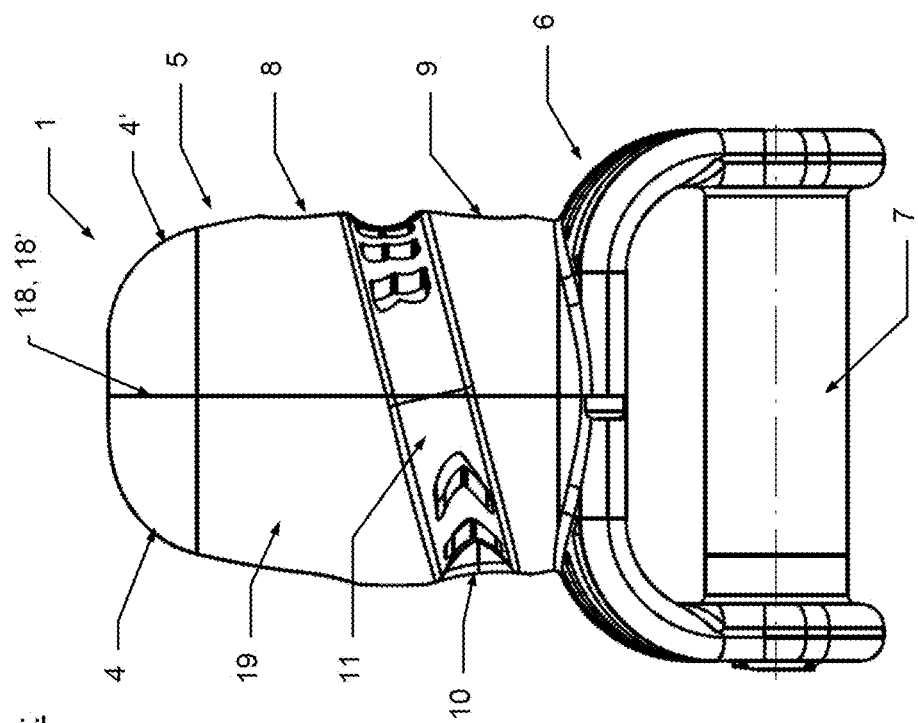
FIG. 1 shows a side view of the suspension device in an exemplary embodiment.

In FIG. 1, the suspension device is depicted as a side view looking at the connection axis 7. It can be seen in this case that the suspension device is made up of an upper part 5 and a lower part 6, wherein the upper part 5 has a rope guide for suspension from a suspension point, for example a wall or ceiling hook, and on the underside lower part 6 a connection axis 7 is arranged for receiving the loop of a hammock or a hanging chair, for example.

If FIGS. 1-3 are looked at together, the rope guide can be clearly identified in relation to the upper part 5. The rope guide in this case provides that the holding rope is introduced in the longitudinal axis of the suspension device into said device in the inlet opening 12, since in this way careful handling of the holding rope can be achieved. A deviation of the holding rope in a recess 13 extending to the side wall, which is also clearly identifiable in the section in FIG. 4, is then brought about in the head of the upper part 5 to a first lateral outlet opening 8, wherein an inlet opening 9 of a second aperture 3 is arranged below this outlet opening 8 at a distance which at least corresponds to the diameter of the apertures 2 and 3. An external loop portion of the holding rope is thereby formed between the outlet opening 8 and the inlet opening 9.

FIGS. 2 and 3 clearly show the view of these apertures 2 and 3. It is therefore the case that on the upper side the suspension rope is introduced through an insertion opening 12 into a recess region 13 and from said recess region through the outlet opening 8. The rope is then introduced directly below back into the upper part in the second aperture 3 and the inlet opening 9 thereof and leaves again through the channel guideway clearly identifiable in FIG. 4 from the outlet opening 10 of the second aperture 3.

Looking at FIG. 1, it becomes clear that after leaving from the outlet opening 10, the holding rope is guided back in the slightly upwardly sloping guideway of the guide channel 11 in a space between the outlet opening 8 and the inlet opening 9. Through the partially recessed arrangement of the holding rope in the guide channel 11, the free holding rope end is guided through below the loop-like external holding rope portion which spans the crossover from outlet opening 8 and inlet opening 9. In this case, the free end of the holding rope is therefore held and when a tensile load is applied it is pressed and fixed fixedly on the outer casing of the upper part 5 of the suspension device. In this way, accidental slippage of the holding rope from this upper part 5 of the suspension device is rendered impossible. Also, the halves 4 and 4' forming the basic body 1 cannot be pivoted in respect of one another around the connection axis 7 when the holding rope is tightened in the guide channel 11.

At the same time, it is also made possible that through the special embodiment of the inlet opening with the recess 13 extending laterally, a deviation of the holding rope on entering the upper part of the suspension device from the longitudinal direction of the suspension device into a transverse direction is possible, wherein a tracking of the holding rope and therefore a shortening of the holding rope when adjusting the suspension length is easily possible. The rope can then be guided out without deviation straight to the outlet opening 8 of the first aperture 2 and retightened accordingly through the further holding rope guide. It is thereby possible for easy adjustability of the length of the holding rope to be readily achieved.

Figure 8:
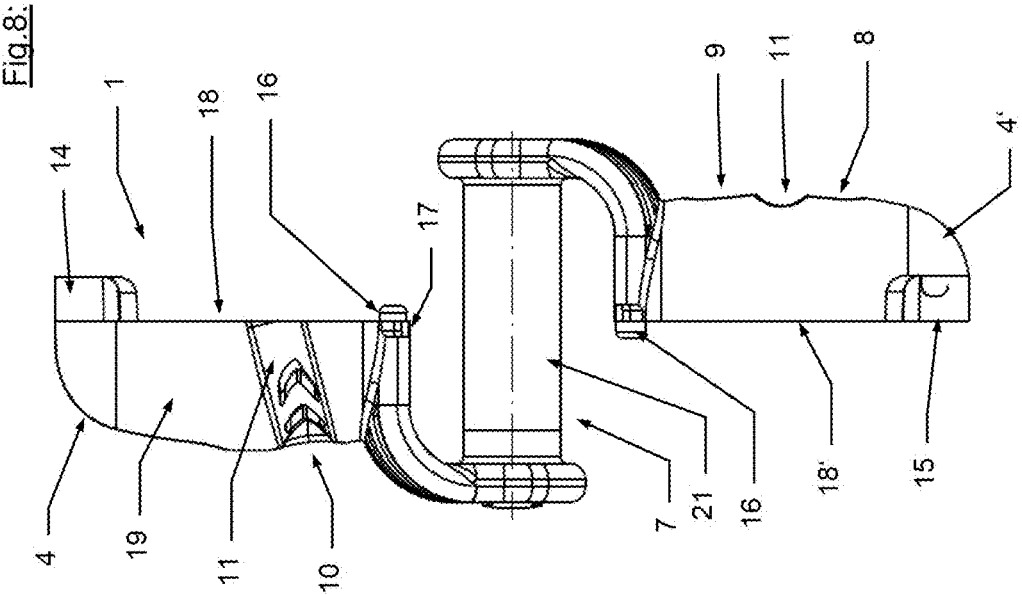
FIG. 8 shows a side view of the suspension device in the opened-up state.
Figure 7:
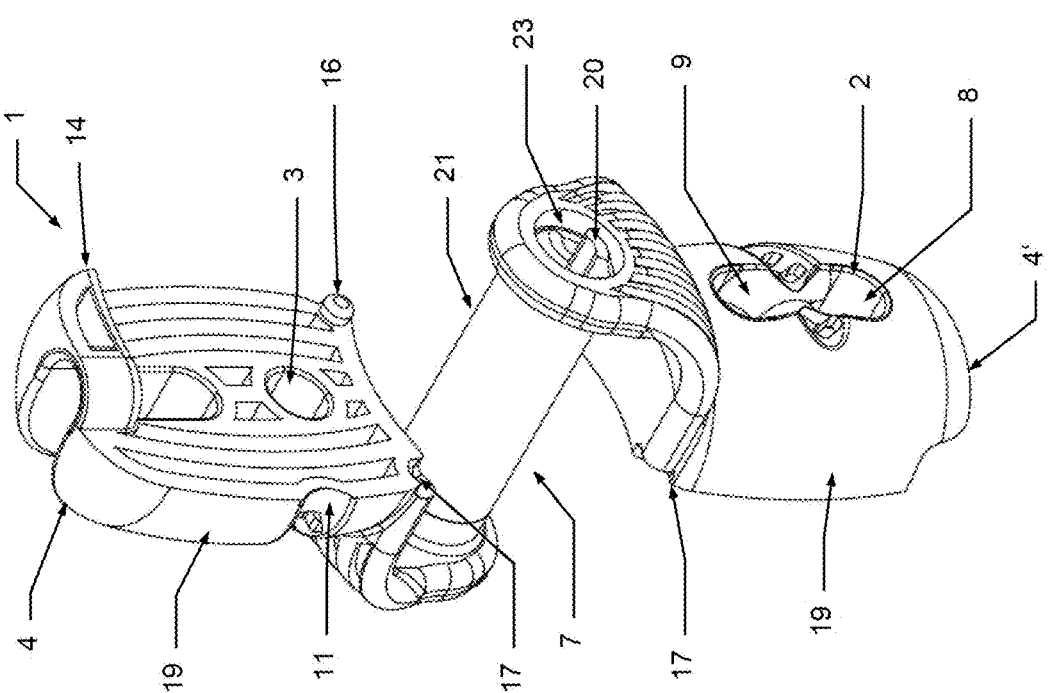
FIG. 7 shows a perspective side view of the suspension device in an opened-up state.

One of the main inventive feature features that the basic body 1 of the suspension device is formed from two halves 4 and 4' that can be pivoted in respect of one another is clearly discernible in this case in FIGS. 6 to 8, as in this case these halves 4 and 4' are pivoted in respect of with respect to one another in FIGS. 7 and 8 and the suspension device is thereby opened for receiving the loop of a hammock, for example, and FIG. 6 shows a suspension device prior to the assembly of the two halves 4 and 4'.

It is possible to see in FIG. 4, in the section of the device according to FIG. 1, how the rope guide runs in the upper part 5, as described. Furthermore, it can be seen here that the connection axis 7 in this exemplary embodiment is formed from a sleeve-like axial portion 21 which is fixedly connected structurally to the half 4' of the basic body 1 and a pin-like axial portion 22 which engages with this axial portion 21 which connects the two halves 4 and 4' of the basic body to one another in the region of the connection axis 7 and in this case engages in the depicted embodiment with a locking connection 20 with a corresponding grading in a receiver 23 of the half 4' in the region of the sleeve-like axial portion 21.

In FIG. 5, through the perspective representation looking at the outlet opening 8 and the inlet opening 9 and the guide channel 11 ending between these two openings 8 and 9, it can be seen how a holding rope which is not shown and is guided through the upper part 5 after leaving from the outlet opening 10 is guided in this guide channel 11 precisely in the region between the outlet opening 8 and the inlet opening 9 of the rope guide. In this way, the free end of the holding rope guided through the upper part 5 is precisely guided in the intermediate region between these two openings 8 and 9, between which the holding rope forms a loop. When the holding rope is tightened, this causes the free end of the rope guided in the guide channel 11 being pressed through this loop formed here fixedly against the upper part 5.

A further essential aspect is also illustrated in FIG. 5 in combination with FIG. 7 or FIG. 6, for example. If one observes FIG. 7, for example, it can be seen that the two halves 4 and 4' in this representation are pivoted away from one another about the connection axis 7. It is possible according to one or more embodiments of the invention for the suspension device opened in this manner to be guided through the loop at the free end of a hammock, for example, and then for the two halves 4 and 4' to be pivoted back together again producing a closed upper part 5 of the suspension device.

In this case, it is clear in combination with FIG. 5 that the rope guide through this basic body 1 composed of two halves 4 and 4' means that the upper part 5 thereof is fixedly closed and therefore a renewed pivoting-open and consequent slipping of a received loop from the connection axis 7 is impossible.

It is clear in this case that, as can be seen in FIGS. 6 to 8, the pivoting movement of the two halves 4 and 4' in respect of one another is limited by a combination of interlocking steps 14 and 15 arranged on the halves 4 and 4' and also projections 16 which engage with recesses 17, i.e. a pivoting movement of the half 4' in relation to the half 4 can only take place as shown in this drawing in one direction, in this case forwards.

In other words, there has to be a pivoting movement which opens the front side 19 of the two halves on the contact surfaces 18 and 18', which is why the arrangement of the guide channel 11 over these two halves 4 and 4' in the region of the front sides side 19 leads to a pivoting movement being reliably precluded in this case. The holding rope guided in the guide channel 11 therefore prevents a relative movement of these two halves 4 and 4' being able to take place. Only following the removal or loosening of this holding rope is it in turn possible for these two halves 4 and 4' to be pivoted along their contact surfaces 18 and 18' about the common connection axis 7.

It is clear from FIG. 6 and the dismantled depiction of the two halves 4 and 4' forming the suspension device that in the present embodiment there is a formation of the connection axis 7 from a sleeve-like axis portion 21 connected to the half 4' and a pin-like axis portion 22 engaging with this axis portion 21. The pin-like portion 22 in this case is guided in the sleeve-like axis portion 21 and has at its free end a locking connection 20 which engages with a corresponding receiver 23 in the lower part 6 of the half 4'. In other words, it is provided in this case that the pin-like axis portion 22 that can be deformed by a slot can be pressed together for insertion into the receiver 23 and then engaged with its locking connection 20 with the step in the receiver 23. In this way, good rotatability of the two halves in the region of the connection axis is guaranteed, since the pin-like axis portion 22 is guided with its outer casing on the inner surface of the sleeve-like axis portion 21.

Different configurations of this construction of the connection axis 7 are provided in this case which are not all depicted in the drawing. On the one hand, it is possible for in one embodiment, the pin-like axis portion 22 to be introduced as is a separate element introduced into a receiver in the lower part 6 of the half 4 of the suspension device. In another embodiment, the pin-like axis portion 22 is fixedly connected to the lower part 6 as a component part. (as shown in original drawing of FIG. 4)

Figure 18:
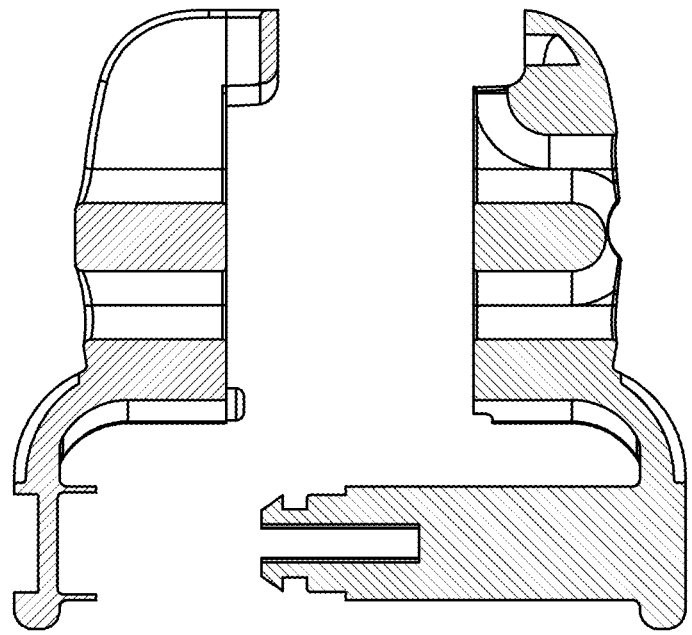
FIG. 18 shows a section view of another embodiment of the suspension device in a dismantled state.
Figure 19:
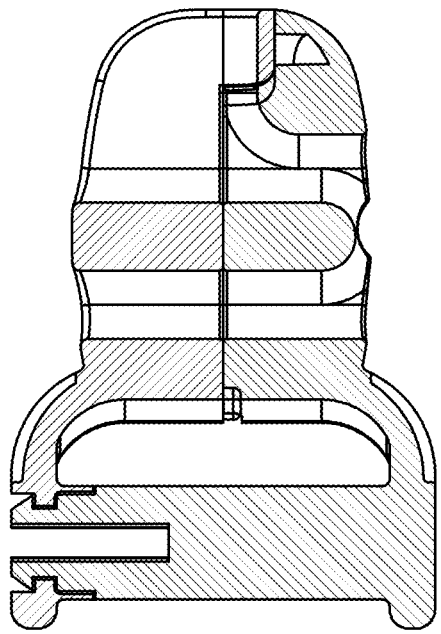
FIG. 19 shows a section view of the FIG. 16 embodiment in a closed state.
Figure 20:
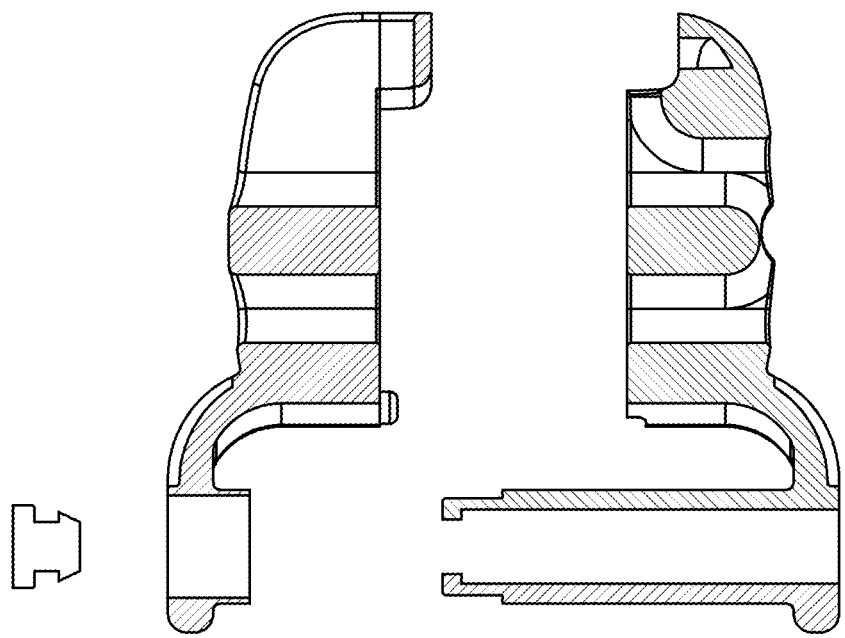
FIG. 20 shows a section view of another embodiment of the suspension device in a dismantled state.
Figure 21:
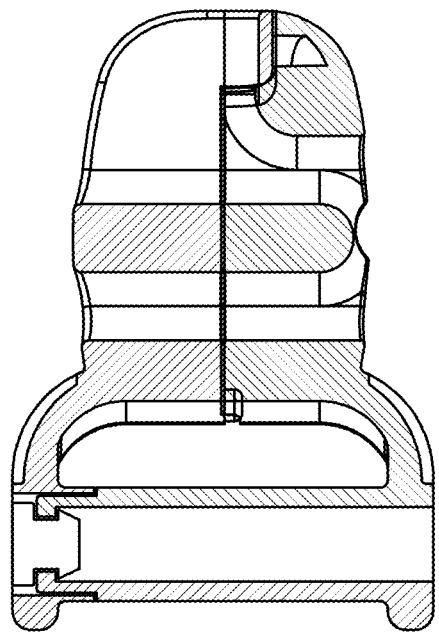
FIG. 21 shows a section view of the FIG. 16 embodiment in a closed state.

A construction of the connection axis 7 without a pin-like axis portion 22 is also possible, in which the sleeve-like axis portion 21 engages directly with a receiver on the first half 4 in the lower part 6 and in this case, for example, is connected to a locking connection 20 (see FIGS. 18 and 19) or separate fasteners (see FIGS. 20 and 21) rotatably therewith.

Figure 16:
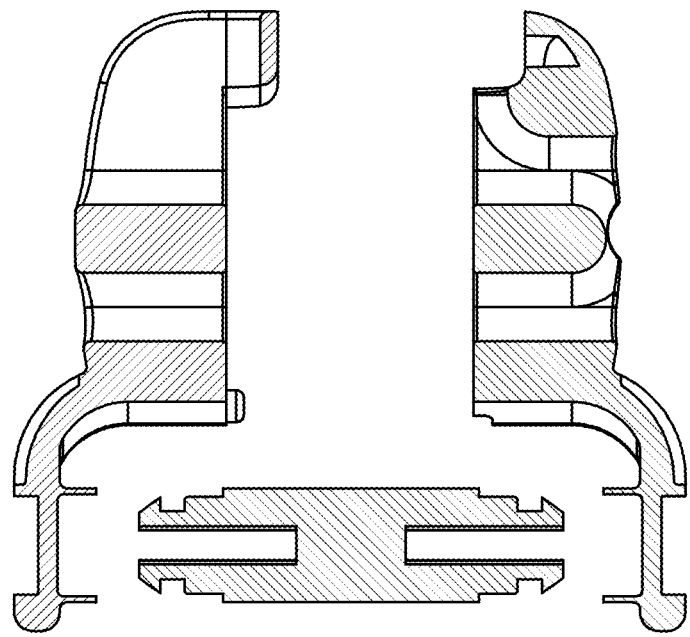
FIG. 16 shows a section view of another embodiment of the suspension device in a dismantled state.
Figure 17:
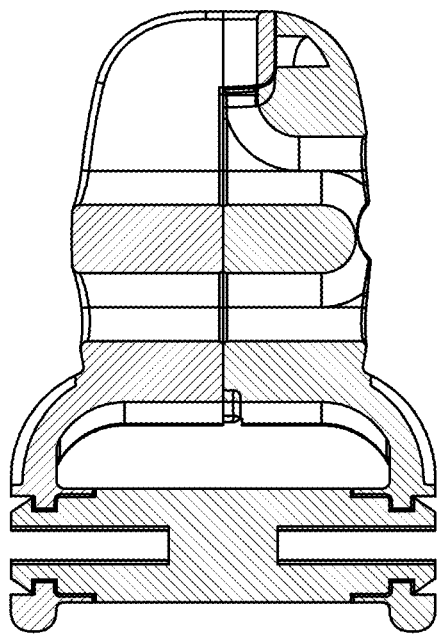
FIG. 17 shows a section view of the FIG. 16 embodiment in a closed state.
Figure 22:
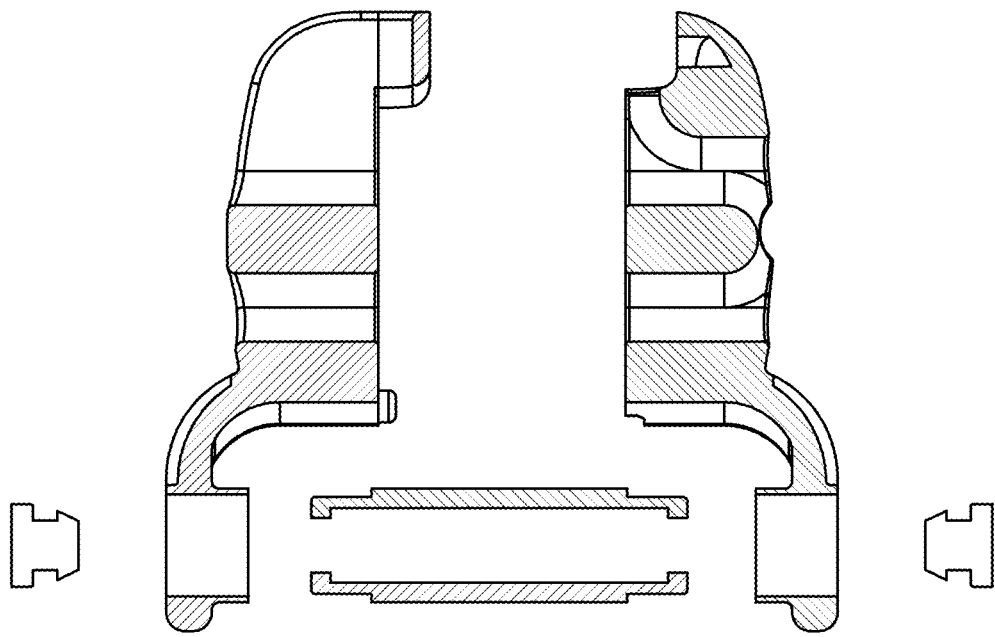
FIG. 22 shows a section view of another embodiment of the suspension device in a dismantled state.
Figure 23:
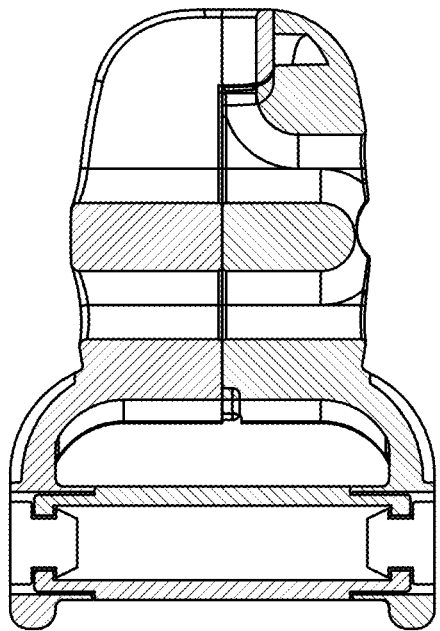
FIG. 23 shows a section view of the FIG. 16 embodiment in a closed state.

A further option would be a sleeve-like axis portion 21 which is connected to the lower parts 6 of the halves 4 and 4' on both sides as a separate component, in that it can be inserted either via a locking connection 20 (see FIGS. 16 and 17) or can be rotatably connected to this sleeve-like axis portion via corresponding fasteners (see FIGS. 22 and 23) on the outside that engage with the openings receiver 23.

Figure 14:
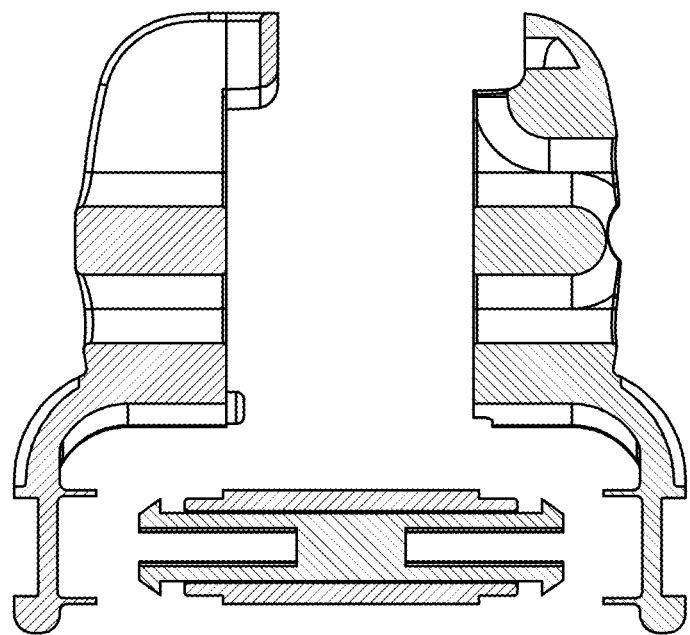
FIG. 14 shows a section view of another embodiment of the suspension device in a dismantled state.
Figure 15:
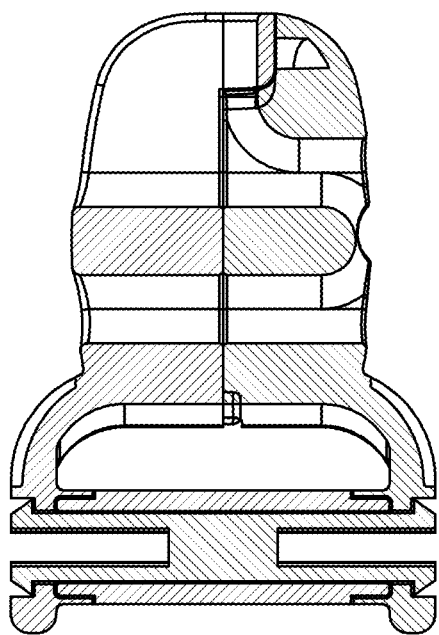
FIG. 15 shows a section view of the FIG. 14 embodiment in a closed state.

Finally, it can also be provided that the sleeve-like axis portion is connected by a continuous pin-like connection pin (see FIGS. 14 and 15) to the two receivers in the lower part of the two halves 4 and 4', so that here too a rotatable connection about this connection axis is realized.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A suspension device for hanging chairs and hammocks, the suspension device comprising a basic body and the basic body having defined therein apertures (2 and 3) arranged for receiving and guiding a suspension rope,
wherein
the basic body comprising at least two halves (4 and 4') which are configured pivotably in respect of one another about a common connection axis (7),
the connection axis (7) forming a lower part (6) of the suspension device and simultaneously a support for a holding loop of a hanging chair or a hammock,
and the apertures (2 and 3) for a length-adjustable arrangement of the suspension rope run in an upper part (5) of the suspension device formed from both halves (4 and 4') of the basic body (1)
and wherein in the upper part (5) in a first half (4) of the basic body (1) an inlet opening (12) in a first aperture (2) for receiving and guiding the suspension rope extends along the upper part, leading to a lateral outlet opening (8) in a second half (4') of the basic body (1) and
at least a second aperture (3) in the upper part (5) extends through both halves (4, 4') of the basic body (1) and leaves from one half (4, 4') of the basic body (1) in each case on both sides,
an inlet opening (9) of the second aperture (3) being arranged below the lateral outlet opening (8) of the first aperture (2) in the second half (4') of the basic body (1).

2. The suspension device for hanging the chairs and the hammocks as claimed in claim 1,
wherein
the basic body (1) is split into two halves (4, 4') along a longitudinal axis,
the apertures (2 and 3) for the length-adjustable arrangement of the suspension rope roughly transversely to the longitudinal axis by both halves (4, 4') of the basic body (1) are arranged extending in the upper part (5).

3. The suspension device for hanging the chairs and the hammocks as claimed in claim 1,
wherein
the outlet opening (8) of the first aperture (2) is at a distance from the inlet opening (9) of the second aperture (3) corresponding to a diameter of the apertures (2, 3).

4. The suspension device for hanging the chairs and the hammocks as claimed in claim 1,
wherein
from an outlet opening (10) of the second aperture (3), a guide channel (11) extending in a recessed manner in the upper part (5) over both halves (4, 4') of the basic body (1) is arranged in a guiding manner for the suspension rope between the outlet opening (8) of the first aperture (2) and the inlet opening (9) of the second aperture (3).

5. The suspension device for hanging the chairs and the hammocks as claimed in claim 1,
wherein
the inlet opening (12) of the first aperture (2) is a slot-like recess (13) extending to a lateral wall of the first half (4) of the upper part (5) of the basic body (1).

6. A suspension device for hanging chairs and hammocks, the suspension device comprising a basic body and the basic body having defined therein apertures (2 and 3) arranged for receiving and guiding a suspension rope,
wherein
the basic body comprising at least two halves (4 and 4') which are configured pivotably in respect of one another about a common connection axis (7),
the connection axis (7) forming a lower part (6) of the suspension device and simultaneously a support for a holding loop of a hanging chair or a hammock,
and the apertures (2 and 3) for a length-adjustable arrangement of the suspension rope run in an upper part (5) of the suspension device formed from both halves (4 and 4') of the basic body (1)
and wherein
the halves (4, 4') of the basic body (1) are guided movably with respect to one another through interlocking steps (14, 15) and/or projections (16) and recesses (17) on contact surfaces (18, 18') thereof in only one direction about the common connection axis (7), and
the steps (14, 15) and/or projections (16) and recesses (17) abut one another when the halves (4, 4') are closed to create the basic body (1) and act as a stop.

7. The suspension device for hanging the chairs and the hammocks as claimed in claim 6,
wherein
a guide channel (11) extending in a recessed manner in the upper part (5) over both halves (4, 4') of the basic body (1) is arranged on one side (19) of the basic body (1) which, due to an arrangement of the steps (14, 15) and/or projections (16) and recesses (17) on the contact surfaces (18, 18') of the two halves (4, 4'), is openable by a rotational movement about the common connection axis (7).

8. A suspension device for hanging chairs and hammocks, the suspension device comprising a basic body and the basic body having defined therein apertures (2 and 3) arranged for receiving and guiding a suspension rope,
wherein the basic body comprising at least two halves (4 and 4') which are configured pivotably in respect of one another about a common connection axis (7), the connection axis (7) forming a lower part (6) of the suspension device and simultaneously a support for a holding loop of a hanging chair or a hammock, and the apertures (2 and 3) for a length-adjustable arrangement of the suspension rope run in an upper part (5) of the suspension device formed from both halves (4 and 4') of the basic body (1)

a structural portion of the connection axis (7) is arranged on each of the halves (4, 4') which, when connected to one another, form the connection axis (7)

and wherein a sleeve-like axis portion (21) of the connection axis (7) on one of the halves (4, 4') of the basic body (1) receives a pin-like axis portion (22) on the other half (4, 4') of the basic body (1), the pin-like axis portion (22) being rotatably fixed in the sleeve-like axis portion (21) by a locking connection (23).

9. A suspension device for hanging chairs and hammocks, the suspension device comprising a basic body and the basic body having defined therein apertures (2 and 3) arranged for receiving and guiding a suspension rope, wherein the basic body comprising at least two halves (4 and 4') which are configured pivotably in respect of one another about a common connection axis (7), the connection axis (7) forming a lower part (6) of the suspension device and simultaneously a support for a holding loop of a hanging chair or a hammock, and the apertures (2 and 3) for a length-adjustable arrangement of the suspension rope run in an upper part (5) of the suspension device formed from both halves (4 and 4') of the basic body (1)

and wherein a sleeve-like axis portion (21) of the connection axis (7) is arranged on one half (4, 4') of the basic body (1) and engages with a receiving on a second half (4, 4') of the basic body (1) and is rotatably connected to the second half (4, 4') of the basic body (1) by a fastening element.

10. A suspension device for hanging chairs and hammocks, the suspension device comprising a basic body and the basic body having defined therein apertures (2 and 3) arranged for receiving and guiding a suspension rope, wherein the basic body comprising at least two halves (4 and 4') which are configured pivotably in respect of one another about a common connection axis (7), the connection axis (7) forming a lower part (6) of the suspension device and simultaneously a support for a holding loop of a hanging chair or a hammock, and the apertures (2 and 3) for a length-adjustable arrangement of the suspension rope run in an upper part (5) of the suspension device formed from both halves (4 and 4') of the basic body (1)

and wherein a sleeve-like axis portion (21) of the connection axis (7) is arranged as a separate component between the two halves of the basic body, and through a locking connection in corresponding receiver with the halves (4, 4') of the basic body (1) is rotatably connected thereto, or is rotatably fastened in or on the halves (4, 4') of the basic body (1) by additional connection elements.

11. The suspension device for hanging the chairs and the hammocks as claimed in claim 10, wherein the sleeve-like axis portion (21) of the connection axis (7)

through a locking connection in corresponding receiving with the halves (4, 4') of the basic body (1) is rotatably connected thereto, and is rotatably fastened in or on the halves (4, 4') of the basic body (1) by additional connection elements.

12. The suspension device for hanging the chairs and the hammocks as claimed in claim 11, wherein the sleeve-like axis portion (21) of the connection axis (7) is rotatably connected by a continuous pin-like, internal connection pin to the halves (4, 4') of the basic body (1) as a separate connection element.

13. The suspension device for hanging the chairs and the hammocks as claimed in claim 10, wherein the sleeve-like axis portion (21) of the connection axis (7) is rotatably connected by a continuous pin-like, internal connection pin to the halves (4, 4') of the basic body (1) as a separate connection element.

* * * * *